United States Patent [19]

Schädlich

[11] 4,209,719
[45] Jun. 24, 1980

[54] TACHOGENERATOR FOR ROTATING MACHINERY

[75] Inventor: Fritz Schädlich, Stetten, Fed. Rep. of Germany

[73] Assignee: Robert Bosch GmbH, Stuttgart, Fed. Rep. of Germany

[21] Appl. No.: 918,403

[22] Filed: Jun. 23, 1978

[30] Foreign Application Priority Data

Jul. 1, 1977 [DE] Fed. Rep. of Germany ....... 2729740

[51] Int. Cl.² ............................................ H02K 15/10
[52] U.S. Cl. ...................................... 310/42; 310/43; 310/155
[58] Field of Search .......... 310/42, 155, 154, 216–218, 310/43

[56] References Cited

U.S. PATENT DOCUMENTS

| | | | |
|---|---|---|---|
| 2,499,326 | 2/1950 | O'Brien | 310/42 UX |
| 2,814,745 | 11/1957 | Sinclair, Jr. | 310/155 |
| 2,816,240 | 12/1957 | Zimmerman | 310/155 |
| 4,007,387 | 2/1977 | Rustecki | 310/42 |

*Primary Examiner*—Donovan F. Duggan
*Attorney, Agent, or Firm*—Frishauf, Holtz, Goodman & Woodward

[57] ABSTRACT

In order to permit the removal of tachogenerator elements during maintenance services performed on the machinery, the magnet assembly of the tachogenerator is stationary, and soft iron core elements are affixed to the rotating shaft of the machinery. For servicing the machinery, the core elements may be removed without disturbing the alignment or calibration of the magnet assembly.

5 Claims, 6 Drawing Figures

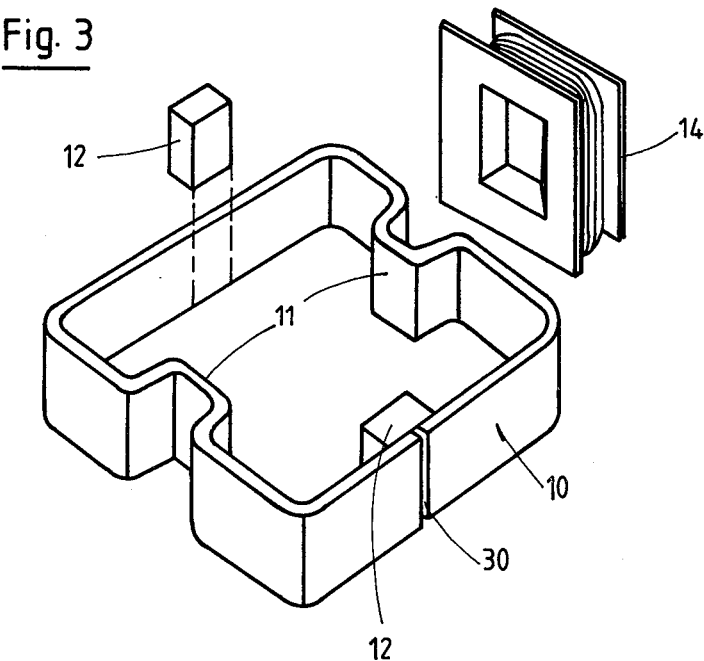
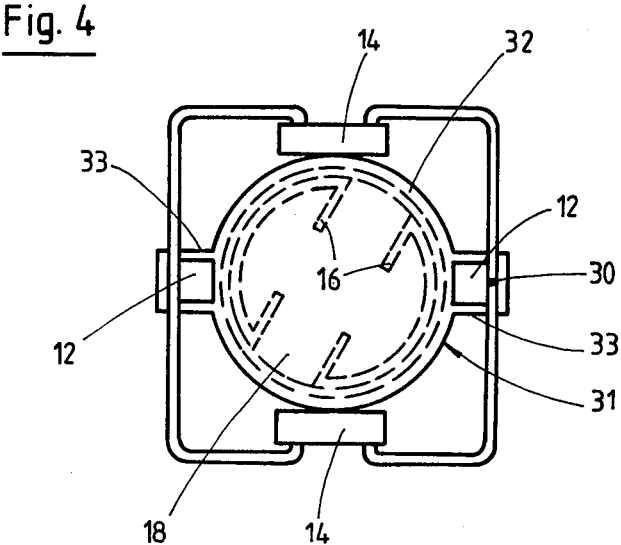

TACHOGENERATOR FOR ROTATING MACHINERY

The present invention relates to a tachogenerator, and, more particularly, to a tachogenerator for use in association with rotating machinery equipped with a top speed limiter.

BACKGROUND AND PRIOR ART

It is common practice to provide rotating machinery with speed governing or speed control devices which are controlled by an rpm-dependent signal from a tachogenerator. Known tachogenerators have a stationary frame or yoke of soft iron forming pole-shoes which carry coils. The rotating portion of the known tachogenerator is a magnet which is attached to the rotating shaft of the machinery. Inasmuch as the shafts of these machines usually rotate in the right-hand sense, it is necessary to use a mounting screw having left-handed threads for attaching the magnet to the shaft in order to prevent its loosening during operation. When service-personnel attempt the removal of the mounting screw during maintenance and repair services, they will often strip the threads of the screw in the attempt to remove it, expecting it to be equipped with the customary right-handed threads. Such damage is especially grave because the magnet assembly in tachogenerators is a calibrated part, uniquely adapted to the particular generator, and cannot usually be readily replaced by another available magnet.

THE INVENTION

It is an object of the present invention to so construct a tachogenerator as to be inexpensive and simple in production and to be unlikely to be accidentally damaged during maintenance and repair services which are performed on the associated machinery.

Briefly, the magnet, the coils and parts of the magnetic flux circuit are combined in a stationary unit which is fixedly attached to a non-rotating part of the machinery, while at least one soft-iron core element is attached to the rotating shaft and rotates within the stationary magnet assembly. The soft-iron core element may be attached to the rotating shaft of the associated machinery without difficulty and in conventional manner, most advantageously by being molded into a plastic plug-like, e.g. cylindrical element.

In accordance with a feature of the invention, the magnetic core assembly includes two coils and two magnets, thereby generating a continuous rpm-dependent signal; and, preferably, the magnetic core assembly includes a soft-iron frame or yoke with diametrically opposite pole pieces on which the two coils are mounted while the two magnets are located at diametrically opposite spaces between the two coils. The rotating soft-iron core includes two essentially semicylindrical elements which rotate within the center of the core assembly and provide intermittent flux linkage between the magnets and the coils during their rotation.

The tachogenerator is particularly well suited for association with top-speed limiters of known or customary form in which knife blades will extend radially, due to centrifugal force, upon operation of a cylindrical holder therefore at excessive speed. Upon extension of the knife blades, they will interfere with a circuit element having a fracture point. The knife blades are held in a cylinder, hereinafter the "knife cylinder". Upon excessive speed of the rotating element, the circuit in which the fracture element is included will be interrupted by breakage of the fracture circuit element due to radial extension of the knife blades under centrifugal force. Resumption of operation requires a repair procedure. The tachogenerator can readily be integrated with such a knife cylinder, for example by forming the plug-like holder for the soft-iron core elements and the knife cylinder as one integral molding.

DRAWINGS, ILLUSTRATING A PREFERRED EXAMPLE

FIG. 3 is a perspective, exploded view of the stationary portion of the tachogenerator;

FIG. 4 is a top view of the assembled tachogenerator;

Figure 1:
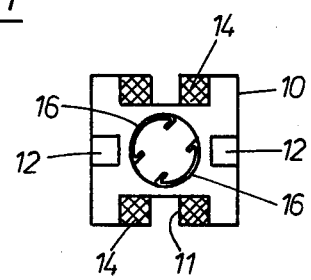
FIG. 1 is a top view of the principal tachogenerator element.

The tachogenerator (see FIGS. 1 and 3) includes a stationary magnetic core assembly having a closed frame 10 made of soft iron and defining a central opening. The frame 10 has two diametrically opposite pole pieces 11, each carrying a coil 14. The frame 10 may be made in simple manner from a strip of ferromagnetic material, for example by bending.

Further mounted on the frame 10 are two magnets 12, located in diametrically opposite positions intermediate the coils 14. The relative angular spacing of successive elements carried by the frame 10 is substantially 90°.

When assembled for operation, the central opening of the frame surrounds a rotating member. This member is plug-like and when part of a top speed limiter, the knife cylinder 18. The knives of the top-speed limiter are not further shown, since this structure is known and conventional. Two soft-iron core elements 16 are retained on cylinder 18. The assembly and structural relationship of the elements is best seen by considering FIGS. 3 to 6: a non-magnetic body 31, for example, of plastic is used to hold the stationary portions of the magnetic system. Body 31 is formed as a thin walled sleeve-like portion 32, of generally cylindrical outline with, however, flattened sides 38. The thin walled body 32 has two diametrically opposite holding portions 33 to hold the magnet 12 and the ring 10. As can be seen from FIG. 5, the entire plastic body at 31 is an integral molding. The portions 33 are each formed with a slit 34 and an inner recess 35. The ring 10 (FIG. 3) is held on the plastic body 31 by inserting the ring 10 in the slits 34 formed by the portions 33. The magnets 12 are slit into the respective recesses 35 in the portions 33 of the body 31. This, simultaneously, connects the magnets to the ring 10—by magnetic attraction—and retains the magnets in position with respect to the body 31. The diametrically oppositely positioned flattened surfaces 38 locate the pole shoes 11 (FIG. 3) of the ring 10.

Figure 5:
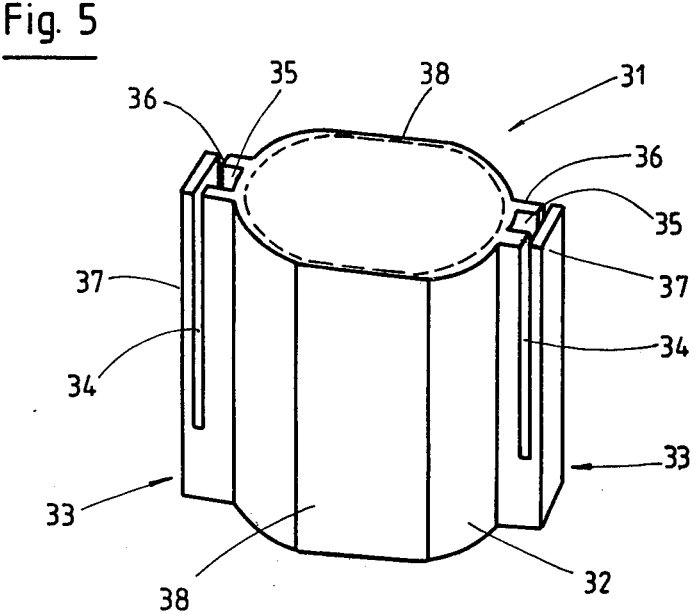
FIG. 5 is a perspective view of the stationary holder portion of the tachogenerator.
Figure 6:
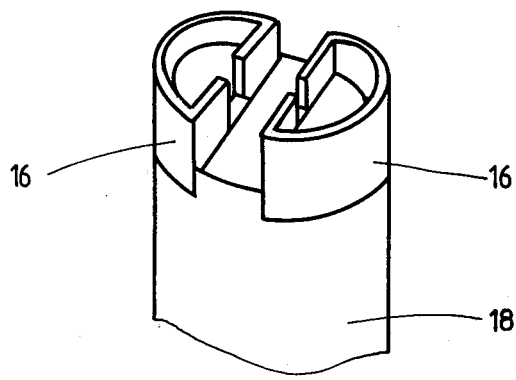
FIG. 6 is a perspective view of the knife cylinder, with the rotary parts of the magnetic system attached thereto.

Sleeve 32 is closed off at one end, for example, at the top side (FIG. 5). The knife cylinder 18 (FIGS. 2, 6) extends from the open side to the sleeve 32 in such a manner that the soft-iron portions 16, shown in broken lines in FIG. 4 will be internally of and opposite the pole shoes 11 and the magnets 12, respectively.

The knife cylinder 18, and the soft-iron elements 16 have slightly smaller outside diameter than the internal minimum diameter of the sleeve element 32 to permit free rotation of the cylinder 18 and the soft-iron elements 16, attached thereto, within the element 32.

In the position illustrated in FIG. 1, one of elements 16 closes a first magnetic circuit defined by the left magnet 12 and the upper pole piece with its coil 14, while the other element 16 closes a second magnetic circuit defined by the right magnet 12 and the pole piece 11 carrying the lower coil 14, all as seen with reference to the illustration of FIG. 1.

As the knife cylinder 18 rotates from the position shown, it will reach a position, 90° later, when two different magnetic circuits are closed, namely a first circuit defined by the left magnet 12 and the lower pole piece and a second circuit defined by the right magnet and the upper pole piece. As the cylinder 18 rotates, the cores 16 thus cyclically close different magnetic circuits in which the direction of flux varies alternately.

Figure 2:
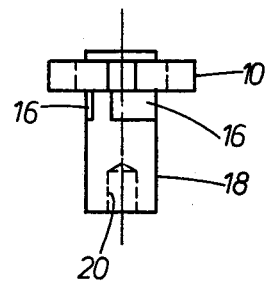
FIG. 2 is a side view of tachogenerator and a part of the top-speed limiter.

The frame 10 and the elements mounted thereon may be attached to any suitable stationary part of the associated machinery. The knife cylinder 18, which is part of the existing top-speed limiter of the machine, is internally threaded as shown in FIG. 2 for engagement with a threaded stud on the rotating shaft of the machine.

The magnets 12 may be made of any suitable material, e.g. metallic or cermaic. The radial thickness of the rotating soft-iron cores as shown in FIG. 1, may be, for example, 1 mm. The clearance between the outside diameter of the rotating cylinder 18 and the interior surfaces of the frame 10 should advantageously be as small as possible, consistent with suitable strength of the sleeve portion 32 of body 31.

The construction of the tachogenerator is simple and rugged. The magnet, and the associated magnetic circuit are carefully calibrated and are not readily replaceable and, preferably, should not be disturbed with respect to the associated coils. The soft-iron elements 16, however, are substantially less critical and replacement of the knife cylinder together with the soft-iron elements, after operation of the knives (not shown) in the knife cylinder will not cause change in the electrical performance characteristics of the tachogenerator. The only requirement would be that the soft-iron elements fit within the body 31 to permit free rotation. Exchange of the magnets within the electromagnetic system, however, is avoided even if the rotating portion of the tachogenerator requires replacement.

Only a single soft-iron element 16 is necessary; the distribution of soft-iron material with respect to the circumference of the knife cylinder is non-symetrical to provide for change in flux linkages between the pole pieces 11 and the magnets 12 as the rotor element formed by the knife cylinder 18 and the soft-iron 16 rotate. The use of at least two soft-iron elements, essentially as shown in the drawings is a preferred form.

The body 31, frame 10, magnets 12 and coil 14 form one assembly. The gap 30 of the frame is bridged by one of the magnets 12. The frame 10 can slip easily in the gap 34 between the inner portion 36 of the portion 33 and the outer portion 37 of portion 33, thus permitting rapid and simple assembly while providing, when assembled, a secure holding arrangement for the stationary magnets and coils in predetermined relative position.

Various changes and modifications may be made within the scope of the inventive concept.

I claim:

1. Tachogenerator for generating electrical signals related to the speed of rotation of a machine member having
    an electromagnetic system including two coil elements (14), two magnet elements (12) and soft-iron flux guide elements (10, 16), and wherein
    the flux guide elements include a soft-iron frame (10) which defines a closed ring having a central opening, said frame being shaped to further define diametrically opposite pole pieces (11) on each of which is mounted one of said two coil elements (14), said two magnet elements (12) being located on diametrically opposite parts of said frame (10) and angularly displaced from said coils (14);
    and two soft-iron core elements (16), coupled to said machine member, of part-cylindrical shape, and having an angular extent to form a rotating magnetic flux path between a pole piece (11) and a magnet element (12) on the frame to bridge the angular gap between a pole piece (11) and a magnet element (12) subsequent thereto in the direction of rotation and, upon continued rotation, to bridge the gap between said magnet element and the next following pole piece (11);
    said part-cylindrical soft-iron elements being separated by a non-magnetic gap;
    said soft-iron frame (10), said magnet element (12) and said coil element (14) being located on a single assembly formed as a plastic molding
    which comprises a body structure (32) of generally sleeve-like, approximately cylindrical form having diametrically outer flattened sides (38) against which the pole pieces (11) of said soft-iron frame (10) are positioned to bear;
    and further formed with outwardly radially projecting portions (33),
    each projecting portion being formed with an axial groove (35) in which the magnet elements (12) are fitted, the soft-iron frame (10) fitting around said magnet elements and said sleeve-like body (32) to engage said magnet elements (12) positioned in said groove (35) and engaging the flattened sides (38) of said generally sleeve-like body (32).

2. Tachogenerator according to claim 1, wherein the soft-iron core elements (16) are directly secured to said machine member.

3. Tachogenerator according to claim 1, further comprising a non-magnetic holding cylinder (18) to which said part-cylindrical soft-iron core elements (16) are secured.

4. Tachogenerator according to claim 3, wherein said part-cylindrical soft-iron core elements (16) and the means holding said cylinder (18) are located concentric with the axis of rotation of said machine member, said soft-iron sections being molded into said cylinder.

5. Tachogenerator according to claim 1, wherein said projecting portions (33) further comprise an axially extending bracket part outwardly surrounding said frame in the region of said grooves (35) retaining said magnet elements (12), to additionally secure and position said frame (10) on said sleeve-like part (32).

* * * * *